United States Patent
Haske et al.

(10) Patent No.: US 10,690,565 B2
(45) Date of Patent: Jun. 23, 2020

(54) IN-SITU GLOVEPORT GLOVE LEAK TESTER

(71) Applicant: UCHICAGO ARGONNE, LLC, Chicago, IL (US)

(72) Inventors: Kyle J. Haske, Willow Springs, IL (US); James E. Smith, Lemont, IL (US); Mark R. Sakowski, Willowbrook, IL (US); Donald E. Preuss, Hinsdale, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 74 days.

(21) Appl. No.: 15/712,877

(22) Filed: Sep. 22, 2017

(65) Prior Publication Data
US 2019/0094102 A1    Mar. 28, 2019

(51) Int. Cl.
*G01M 3/32* (2006.01)
*B25J 21/02* (2006.01)

(52) U.S. Cl.
CPC .......... *G01M 3/3209* (2013.01); *B25J 21/02* (2013.01); *G01M 3/3218* (2013.01)

(58) Field of Classification Search
CPC .. G01M 3/3209; G01M 3/3218; G01M 3/329; G01M 3/3272; G01M 3/3245; G01M 3/3236; G01M 3/32; G01M 3/26; G01M 3/363; G01M 3/3263
USPC ............ 73/40, 45.4, 49.2, 49.3, 49.8, 37, 52
See application file for complete search history.

(56) References Cited

U.S. PATENT DOCUMENTS

| 1,773,546 A * | 8/1930 | Rider ...................... H05B 3/78 |
| | | 392/313 |
| 4,206,631 A | 6/1980 | Nysse et al. |
| 6,810,715 B2 * | 11/2004 | Castro ................. G01M 3/3218 |
| | | 73/37 |
| 7,174,772 B2 | 2/2007 | Sacca |

(Continued)

FOREIGN PATENT DOCUMENTS

FR    2530813 A1 *  1/1984  ............ G01M 3/027

OTHER PUBLICATIONS

English Translation FR 2530813, Legendre, Leak-detection device for a glove of a box with gloves comprising means for pressurizing the glove, Jan. 1984 (Year: 1984).*

*Primary Examiner* — John Fitzgerald
*Assistant Examiner* — Truong D Phan
(74) *Attorney, Agent, or Firm* — Cherskov Flaynik & Gurda, LLC

(57) ABSTRACT

The invention provides a system for detecting leaks in glovebox gloves, the system having a first seal within a glovebox aperture; a second seal contacting exterior surfaces of a glovebox, wherein the exterior surfaces define a periphery of the aperture; a first fluid supply for circumferentially expanding the first seal against center facing surfaces of the aperture to a first pressure; a second fluid supply for inflating the glove to a second pressure; and a pressure gauge for detecting a pressure decrease of the second pressure. Also provided is an in situ method for detecting leaks in glove box gloves, the method having the steps of applying a radially directed force to inside surfaces of cuffs of the gloves to hermetically seal the gloves from the exterior of the glovebox, thereby establishing a seal; inflating the gloves to a pressure; and monitoring the pressure for any decrease in pressure.

14 Claims, 3 Drawing Sheets

(56) References Cited

U.S. PATENT DOCUMENTS

2011/0000282 A1* 1/2011 Cournoyer .......... G01M 3/3263
73/40
2011/0259933 A1* 10/2011 Dossow ............... B60K 15/067
224/538

* cited by examiner

IN-SITU GLOVEPORT GLOVE LEAK TESTER

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to glovebox leak testing and more specifically, this invention relates to a system and method for checking gloves still attached to their gloveboxes for leaks.

2. Background of the Invention

Gloveboxes are an integral part of any laboratory. They are designed to confine reaction systems to a particular atmosphere, primarily to protect the laboratory worker who is manipulating reactants and observing results.

In glovebox scenarios, reactants are caustic or otherwise hazardous, which is why the reaction environment in those scenarios are hermetically sealed or otherwise removed from the atmosphere in which laboratory personnel operate.

Gloves used in conjunction with gloveboxes have thicknesses typically between 15 mils and 30 mils. By necessity, the gloves must be flexible and allow a certain tactile feel for the wearer so as to facilitate fine motor skills such as pipetting, measuring small reactant amounts (liquid or solid), and even microscope operation. Therefore, inherent with these characteristics required is the potential for puncture, chemical degradation or general wear and tear, such that leaks develop in the gloves. Cournoyer, et al. from Los Alamos National Laboratory have shown that 40 percent of glovebox containment values are due to degradation of gloves, resulting in unplanned breaches in the glovebox containment.

State of the art leak detection systems have a hole diameter limitation of approximately 1/32 inches. For example, one leak detection method relies on visual inspections. This has proven to be inadequate for identifying microscopic leaks not visible to the naked eye. Other drawbacks of these systems include the need for electrical power, which makes their transport and use in remote locations problematic. Also generally, state of the art systems are bulky in that they mount on the outside of glove port rings.

A need exists in the art for a glovebox glove leak testing system and method that overcomes these drawbacks. The system and method should detect leaks below the current 1/32 inch threshold now exhibited by the state of the art. The system and method should be completely pneumatic in operation such that no electricity is required to operate the system. The system and method should be modular and capable of being applied to gloveboxes in cramped spaces, such that the actual testing module can be extended from its control panel a distance limited only by the length of the pressurized lines attached to the testing module.

SUMMARY OF INVENTION

An object of the invention is to provide a system and method for detecting leaks in glovebox gloves that overcomes many of the drawbacks of the prior art.

Another object of the invention is to provide a system and method for in situ detection of leaks in glovebox gloves. A feature of the invention is that it is capable of detecting leaks as small as 1/64 inches. An advantage is that glovebox personnel are conferred an additional layer of protection compared to state of the art system limitations.

Still another object of the invention is to provide a system and method for performing pressure decay leak tests on gloves attached to standard 8 inch diameter glovebox apertures. A feature of the invention is that a modular device operates remotely from its pressure source to both seal the interior of the glove from the ambient environment and test the glove for leaks. An advantage is that the modular device remains inserted within the aperture for the duration of the sealing and testing.

Yet another object of the present invention is a system and method for detecting leaks in gloves which remain attached to gloveboxes. A feature of the invention is the incorporation of a radially extending primary seal and a simultaneously imposed secondary axially to hermetically isolate the interior of the glove from the ambient environment. An advantage of the invention is that the compact footprint of the radially extending primary seal allows for leak testing without having to remove shielding or equipment that may be installed adjacent to the glove port.

Briefly, the invention provides a system for detecting leaks in glovebox gloves, the system comprising a first seal positioned within a glovebox aperture; a second seal contacting exterior surfaces of a glovebox, wherein the exterior surfaces define a periphery of the aperture; a first pressurized fluid supply for circumferentially expanding the first seal against center facing surfaces of the aperture to a first pressure; a second pressurized fluid supply for inflating the glove to a second pressure; and a pressure gauge for detecting a pressure decrease of the second pressure.

Also provided is an in situ method for detecting leaks in gloves attached to glove ports of a glovebox, the method comprising applying a radially directed force to inside surfaces of cuffs of the gloves so as to hermetically seal the gloves from the exterior of the glovebox, thereby establishing a first seal; inflating the gloves to a first pressure; and monitoring the first pressure for any decrease in pressure.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
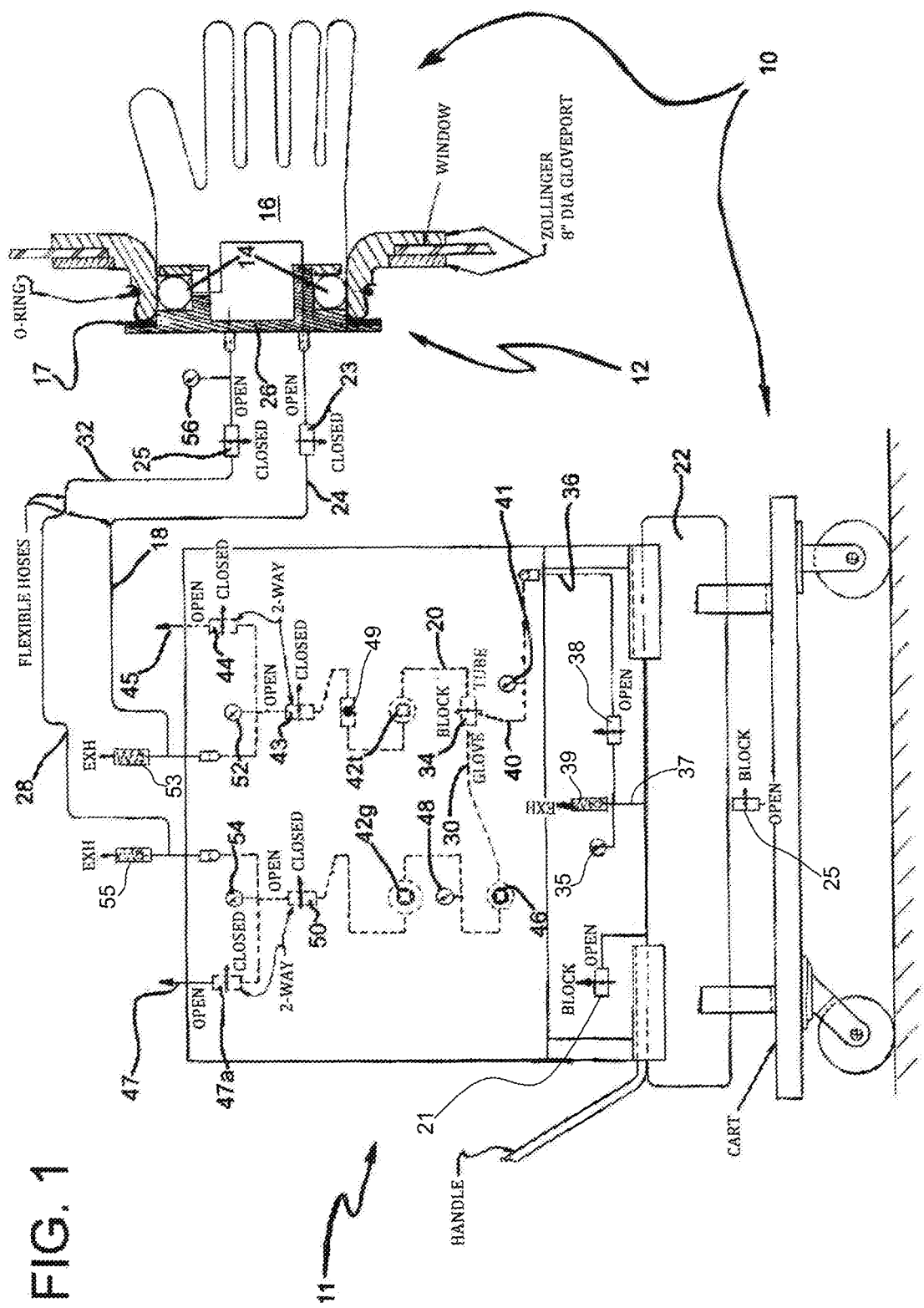
FIG. 1 is a schematic view of a system for detecting leaks in glovebox gloves, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a Gloveport Glove Testing System (GGTS) that provides quick, affordable, and reliable In-Situ testing of containment in glovebox gloves for microscopic leaks. The invention is primarily designed to be used for negative pressure gloveboxes. (Negative pressure means that the atmosphere within the glove box is at a lower pressure than ambient pressure.)

The GGTS uses a pressure decay process to determine glove failure and leakage. Holes as small as $\frac{1}{64}^{th}$ of an inch (397 microns) in diameter can be detected with the invented method and device. Typical tests are 3 minutes in length, but can be longer or shorter, depending on the size of the breach.

A glove tester module (discussed below) is the main component of the GGTS. The sealing mechanism is sized to fit with gloves inserted into an eight-inch diameter glove port, such as a Zollinger Glove Ring. It can be adapted for other glove port sizes. It provides a leak free seal between the glove interior and the room atmosphere. Benefits of the invention include its lightweight and portability, ease of operation and maintenance, and no requirement for external electric power or unique parts. The module is fitted with a calibrated analog pressure gauge which allows for measuring leak rates.

FIG. 1 is a schematic diagram of a system for testing glovebox gloves in situ, that system designated as numeral 10. A salient feature of the invention is the above stated glove tester module 12 which comprises a reversibly inflatable collar 14. The collar 14, in a deflated mode, allows the tester to be inserted into the aperture 15 (FIG. 2) of a glove such that the interior periphery of the cuff of the glove resides between the collar and the glovebox aperture 15. (Standard glovebox diameters for gloves is eight inches, but the invented system is not relegated to that diameter.)

Upon inflation, the collar expands 14 radially against the interior periphery of the cuff so as to compress the cuff against the periphery of the glovebox aperture 15, thereby providing an expanding circumferential seal on the inside of the gloveport. This enables testing gloves for leaks while the gloves are still attached to the glovebox. A secondary seal 17 is provided by a gasket material butted up against the face of the gloveport 15.

The collar, which may comprise an inner-tube, is charged with a pressurized fluid (e.g., air, nitrogen, $CO_2$, etc.) via a first fluid ingress conduit 18 having a first end 20 originating at a three way valve 34. A second end 24 terminates at a manifold 26 proximal to the collar via a first two way valve 23 positioned intermediate the second end 24 and the manifold 26.

A first port of the three way valve 34 accepts fluid from a fluid reservoir 22 to initially charge the system. A tank fill port and valve 21 may be situated upstream of the fluid reservoir. The fluid reservoir 22 may include a tank drain valve 25.

A third fluid conduit, 36 with a first end 37 originating at the fluid reservoir 22 and a second end 40 terminating at the ingress port of the three-way valve, supplies pressurized fluid to the valve. That first valve is then closed and a second port of the three way valve is opened to charge the first fluid conduit 18. The first two way valve 23, intermediate the second end of the first conduit 18 and the manifold 26, is provided as a hermetic seal between the main pressure loop 18 and the collar 14.

The glove 16 undergoing testing is charged with a second conduit 28. The second conduit 28 is provided as a second means of fluid ingress from the pressurized fluid supply 22 to the manifold 26. A first end 30 of the second conduit originates at the three way valve 34 while a second end 32 of the second conduit is attached to a second two way valve 25 mounted to and in fluid communication with the manifold 26.

Pressure drop during the test is monitored via a pressure gauge 56 positioned at the second end of the second fluid conduit and intermediate the second two way valve 25 of that conduit and the manifold 26. (That pressure gauge may have a range of between 0 and 30 inches WC.)

Component Detail

The GGTS includes a multi-gallon air receiver tank 22 and a pneumatic control panel 11. A gas source 22 is used for the module 12 to perform the pressure decay leak test. A myriad of gasses are suitable, including air, nitrogen, argon, $CO_2$ and combinations thereof. Generally, any noncorrosive gas can be utilized.

The receiver tank may be filled with dedicated building compressed air or filled from compressed gas cylinders. In an application of the invented system and method, the receiver tank is filled and pressurized to approximately 90 psig. This will allow enough capacity for testing approximately 20 glovebox gloves.

A control panel 11 regulates fluid flow to and from the testing module 12. The control panel 11 comprises and physically support the first fluid conduit 18 and the second fluid conduit 28. As discussed, supra, pressure regulators, pressure relief devices and values provide compressed gas to the inflatable rubber tube 14 for the primary seal, and to inflate the glove for pressure decay testing.

The control panel 11 operates under two modes: the sealing mode and the testing mode. The sealing mode regulates the 90 psi tank pressure to about 22 psig operating pressure in the first fluid conduit 18 to provide a reliable primary seal between the interior surface of the glove cuff and the testing module 12.

Once the primary seal is obtained (which is to say the radially biased seal fully deployed and perhaps reversibly deformed against the medially facing edge of the glovebox port), a three way valve 34 is actuated to switch operations from the sealing mode to the glove inflation and testing mode. The glove testing mode regulates the 90 psig tank pressure to a lower operating pressure relative to the pressure necessary to establish the primary seal. For example, the primary seal pressure for sufficiently inflating the inner tube 14 ranges from about 20 psig to about 25 psig, while suitable glove inflation pressures are approximately 0.3 psig (approximately 8 inches water column).

Figure 2:
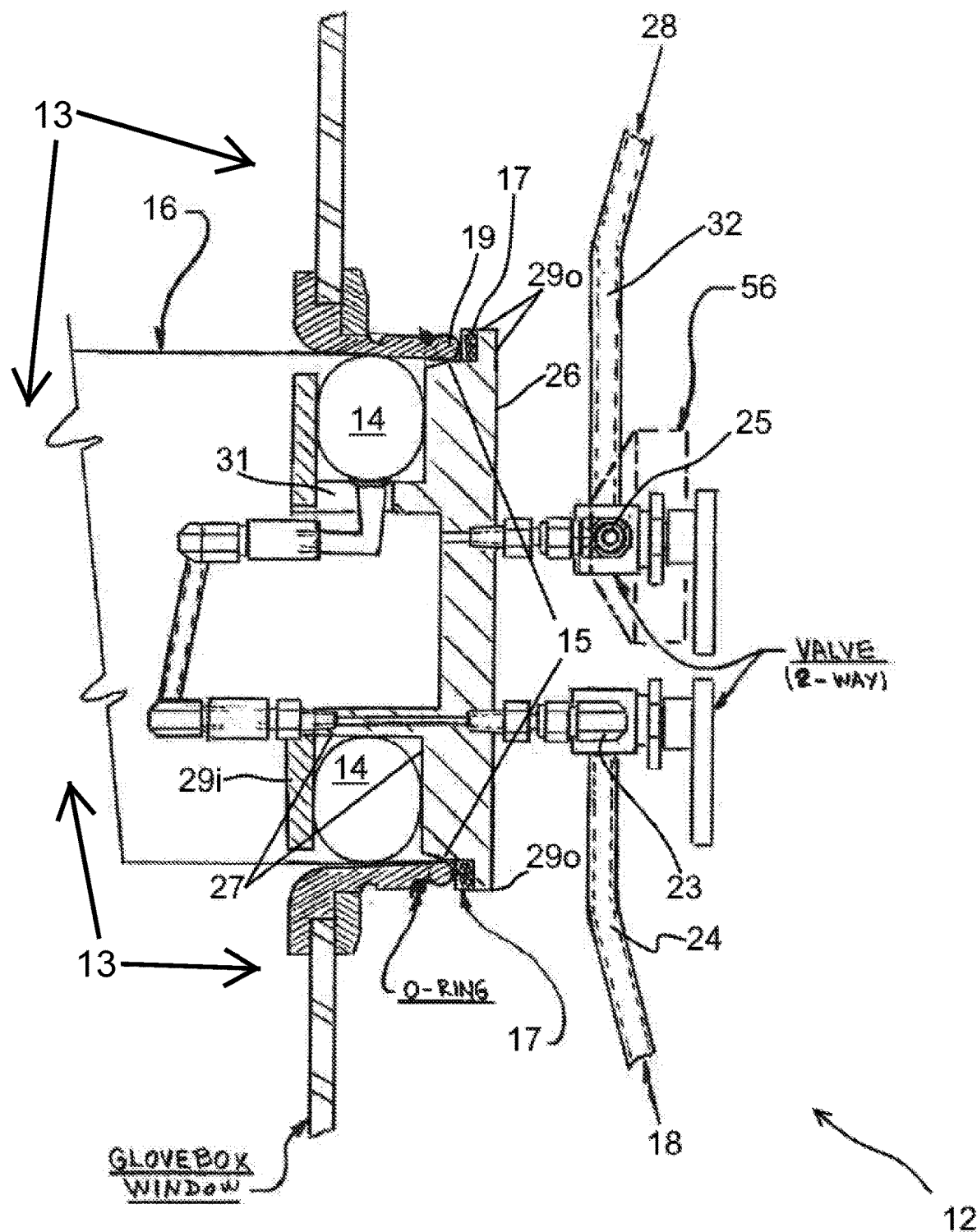
FIG. 2 is a detailed depiction of the glove leak test module, in accordance with features of the present invention.

FIG. 2 is a detailed view of the modular leak tester 12. This figure is provided to provide fluid conduit detail through the manifold 26 of the tester 12. As discussed supra, a second end 24 of a first fluid conduit 18 terminates in a valve 23. This valve 23 may be a two way valve so as to selectively charge the circumferentially expanding seal 14. A similar configuration exists for charging the glove with pressurized fluid: The second end 32 of the second fluid conduit 28 terminates in a second two way valve 25. The two way valve is in fluid communication with the interior void defined by the glove 16. Flow to the inner tube 14 is routed from the gas supply into the manifold and then from the manifold through tubing/tube fittings to the inner tube. Flow to the glove is routed from the gas supply 22, stepped down in pressure, and then through the manifold 26 and into the glove interior.

FIG. 2 also depicts the gasket 17 for forming the secondary seal 17 compressed against a laterally protruding lip 19 of the glove port aperture 15, that laterally protruding lip comprising an exterior surface of the glovebox 13. This secondary gasket is removably secured to exterior surfaces 19 of the glovebox 13 defining the port aperture 15. The hermetic action of the secondary seal is established simultaneously with when the first seal is established. This is because both the inner tube 14 and the gasket 17 forming the secondary seal are both supported by the manifold 26. The shape of the manifold maybe similar to the shape formed by the glovebox port, so as to be circular in most instances. However, as long as radial aspects of the manifold overhang the entire peripherial edge of the gloveport so as to impose pressure upon the secondary gasket 17 at the manifold's final nesting point within the glovebox port, overall shape of the manifold is not crucial.

The reversibly inflatable tube 14 is received by a periphery 27 of the manifold 26. The periphery 27 defines a circumferentially extending annular channel defined by a pair of radially extending surfaces 29$i$ ("i" for that surface residing within the glovebox 13 when the manifold 26 nests fully within the gloveport), and 29$o$ ("o" for that surface residing outside of the glovebox 13 when the manifold nests fully within the gloveport). The outside radially extending flange or surface 29$o$ defines an outer diameter of the manifold 26 that is relatively larger than the diameter of the gloveport, thereby defining an overhang. This overhang prevents over insertion of the manifold into the gloveport. Also, the medially facing surface of this overhang provides support for the gasket 17 so that the gasket 17 is positioned between the medially facing surface of the second radially extending surface 29$o$ and the exterior of the glovebox. Preferably, the overhang backstops the entire width of the gasket 17. Positioned at the proximal ends of the surfaces 29$i$ and 29$o$ is a perpendicularly disposed surface 31 so as to form a floor of the channel.

Upon inflation, the tube 14 compresses against medially facing surfaces of the radially extending surfaces 29 and the floor 31, thereby establishing additional hermetic seals between interior regions of the glove and the outside of the glovebox. FIG. 2 shows the tube slightly deformed as a result of this compression effect.

A myriad of materials are commercially available as the sealing substrate for the tube 14. For example, inner tube Model Number 20991 2.80/2.50-4 inner tube from Marathon, a division of Global Industries, or Item Number 4991T29 angled inner tube from McMaster-Carr, is suitable. Generally, the tube, when inflated has an outside diameter of approximately 8 inches. Other tube sizes would be used for concomitantly different glove port aperture diameters. The secondary seal 17 gasket material may comprise reversibly deformable material selected from the group consisting of silicone foam (closed cell), neoprene foam (closed cell), rubber, and combinations thereof.

A salient feature of the system is that the modular leak tester 12 can operate at a location remote from its control panel 11 or pressurized fluid supply 22. The module can be placed within the glove port with a single human hand, and without mechanical assistance (cable pullers, winches, etc.). Another feature is that the modular leak tester mounts inside of the glove port rings. Also, the system is simple in design in that no electronics are involved. Rather, the system is run entirely pneumatically. These features free up or otherwise allows other surfaces or glove ports to remain unencumbered and uncluttered during testing of a particular glove or pair of gloves. The module 12 of the GGTS is designed to test one glove at a time. If the glove is determined to have a leak, then only that glove is replaced. However, additional piping and valves can be incorporated within the control panel to accommodate a second module 12 to work simultaneously with the first module.

Figure 3:
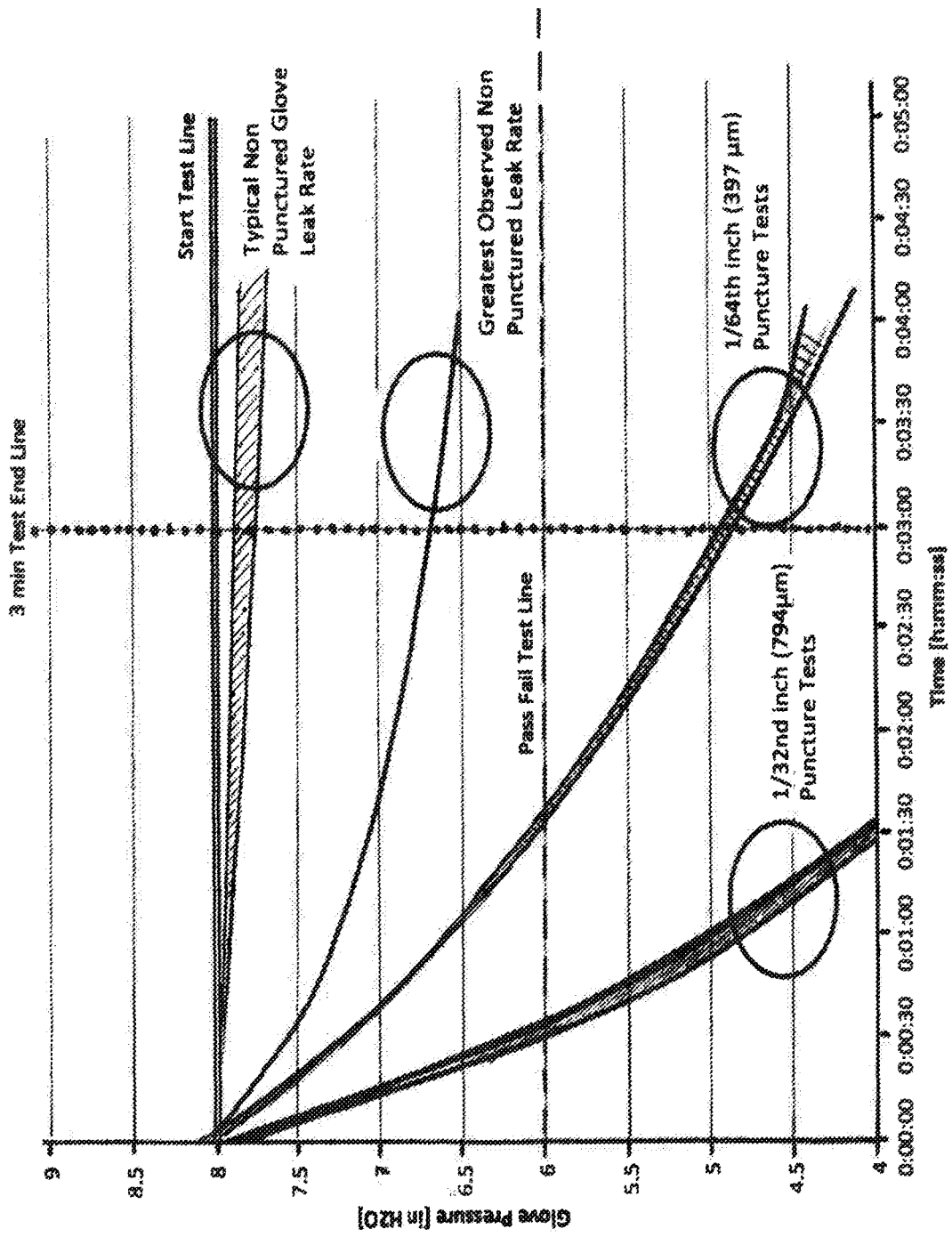
FIG. 3 is a graph of testing system results, in accordance with features of the present invention.

FIG. 3 is a graph showing results of the leak testing with the invented system and method. As can be discerned from the graph, punctures of $1/64^{th}$ of an inch were detected almost immediately. Whereas nonpunctured leak rates (i.e., pressure drop) over a period of 3 minutes varied between 0.1 and 1.5 inches water column, leak rates (i.e., pressure drop) of $1/64"$ punctures varied between 3 and 3.4 inches water column over the 3 minute test period.

FIG. 3 also depicts leak rates (i.e., pressure drop) of $1/32"$ punctures of 4 inches of water in ~1.5 minutes of the 3 minute test period.

EXAMPLE

While a myriad of operating protocols can be applied to the invented method, the inventors envision the following general procedure for conducting leak tests:

Locate the compressed air or inert gas source specified by the user. Also obtain the user's dual-stage pressure regulator and pneumatic hose rated at minimum 300 psi. At the discretion of the respective facility, a building air hookup that provides no greater than 100 psig may be used.

Verify that the user's pressure regulator is closed. Verify that the GGTS tank 22 fill valve and the tank block valve 38 are closed. Also verify that the three-way directional valve 34 is set to block. Upstream from the block valve 38 may be positioned a pressure relieve valve 39. That relief valve 39 may be set at 125 psig. In fluid communication with that relief valve may be a pressure gauge 35 having a range of between 0 and 160 psig.

Attach the user's pressure regulator 42 to the gas cylinder (or the building air hookup) and connect a pneumatic hose from the regulator to the tank fill port.

Use the pneumatic hose to connect the pressure regulator and GGTS tank fill valve. Slowly open the GGTS tank fill valve. Slowly open the gas or air source valve.

Slowly open the pressure regulator valve to begin filling the GGTS tank 22. Fill it to a maximum pressure of 90 psig.

Once the GGTS tank is filled, close the gas or air source valve. Close the GGTS tank fill valve. Close the pressure regulator. Slowly unscrew the pneumatic hose from the GGTS tank fill valve and bleed the remaining air out of it. Once the pressure regulator output pressure gauge reads 0 psig, unscrew or "quick-disconnect" the pneumatic line from the tank fill valve and user's pressure regulator.

In order to tune the GGTS regulators, close all valves and pressure regulators. Remove GLOVE side pressure regulators 46 and 42g and use an appropriate socket wrench (e.g., 9/32-in) to perform adjustments. (Pressure regulators operate as follows: clockwise to open and counterclockwise to close.) An exemplary first glove side pressure regulator may have an operating range of from 0 to 10 psig, with a maximum inlet pressure of 100 psig. The second glove side pressure regulator 42g, situated downstream from the first regulator 46, may have an operating range of between 0 and 2 psig, with a maximum inlet pressure of 15 psig.

Set metering valves to full open. Slowly open the tank block valve, allow pressure to flow up to the three way valve 34, and verify that the pressure gauge 41 positioned upstream of the threeway valve 34 is within ±3 psi of the tank pressure gauge. This pressure gauge may have a range of between 0 and 160 psig.

To tune inner tube 14 inflation, slowly set the three way valve 34 to the first fluid conduit 18 and allow pressure to flow to the pressure regulator 42t. An exemplary tube side pressure regulator 42 may have an operating range of from 0 to 25 psig and a maximum inlet pressure of 100 psig. Close an upstream valve 43 positioned between the regulator 42t and the downstream valve 44, wherein the downstream valve 44 is proximal to a vent port 45 dedicated to the first conduit 18. A metering valve 49 may be positioned between the upstream valve 43 and the pressure regulator 42t. Downstream from the tube side pressure regulator 42 is a pressure gauge 52. An exemplary operating range of the gauge 52 is between 0 and 30 psig. Downstream of that pressure gauge 52 may be situated a pressure relief valve 53. This pressure relief valve 53 may be set at 32 psig.

Slowly adjust the pressure regulator 42t to an output of approximately 22.5±1 psig. Adjust the metering valve to obtain the desired glove fill rate and vent through the valve 44 as necessary.

Slowly set the three way valve 34 to establish fluid communication between it and the second fluid conduit 28, so as to allow pressure to flow to the glove line 28 pressure regulator 46, whereby the pressure regulator is positioned upstream of a glove line vent 47 port and downstream of the three way valve 34. Slowly adjust the first glove line pressure regulator 46 to an output of about 10 psig, as indicated by the pressure reading on the glove line pressure gauge 48 positioned immediately downstream. A first two way valve in the first conduit 18 is opened, that valve positioned downstream of the pressure gauge 54.

Slowly adjust the pressure regulator 42g to output the glove testing pressure of 8 inches water column (hereinafter "in. WC") but no greater than three turns open (clock-wise). This corresponds to a 30- to 60-second glove fill time. The pressure regulator 42g has an operating range up to 2 psig (55.4 in. WC) and ideally is to be set at its lower operating range of the glove testing pressure of 0.29 psig (8 in. WC).

Prior to using the GGTS to test a glove, inspect the glove to be tested for any obvious signs of leaks/deterioration. As needed, pause work for glove inspection or gauge recalibration.

Before initiating testing, view the GGTS tank pressure gauge and If the gauge reads greater than 90 psig, slowly open the tank drain valve to vent excess pressure. Close all valves on the control panel 11 and the glove tester module 12.

Open the GGTS tank block valve and verify that the tank pressure gauge 41 reads less than or equal to 90 psig and is within ±3 psi of the tank pressure gauge. Insert the glove tester module 12 into the glove 16 to be tested. Set the three way valve 34 to charge the first fluid conduit 18. Open the upstream valve 43 and wait for its respective pressure gauge 52 (which is situated directly downstream of the upstream valve 43) to stabilize at a reading of 20-25 psig. Insert the glove tester module 12 into the gloveport 15 until the radially extending flange 290 abuts the exterior periphery of the gloveport. This will assure a proper gasket 17 and seal 14 positioning before inflating the tube.

Open the upstream valve 43 to inflate the tube and wait until the pressure gauge 52 reading stabilizes at 20-25 psig. Close that upstream valve 43.

Set the three way valve 34 to charge the second fluid conduit 28 (i.e., the glove charge line). View the first glove line pressure gauge 48 and verify that it reads less than 15 psig.

Open the first two-way valve 50 on the second fluid conduit 28 and wait until its downstream pressure gauge 54 stabilizes. This pressure gauge 54 may have an operating range of between 0 and 5 psig. Downstream of this pressure gauge 54 is a pressure relief valve 55 which may be set at a release pressure of 1 psig. Then, open the second two way valve 25 proximal to the manifold 26 and wait approximately 1-2 minutes, until the glove 16 fills with gas, while watching its respective pressure gauge 56 which is in fluid communication with both the two way valve 50 and the interior void of the glove 16. While the glove is filling with gas, the pressure gauge 56 will slowly rise in pressure. Once glove is filled, pressure will start to rise rapidly. If glove pressure inadvertently goes over 10 in. WC, the operator may terminate the test as there is the potential for false positive results. The operator may wait until glove pressure reaches 9 in. WC for 30-mil gloves or 6 in. WC for 15-mil gloves.

When the pressure gauge 59 reads 9 inches WC, close the second two-way valve 25 and then the first two way valve 50 on the second fluid conduit 28. When the glove pressure drops to 1 in. WC (+/−0.2 in. WC), start the timer (8 in. WC for 30-mil gloves or 5 in. WC for 15-mil gloves). Wait 3 minutes for pressure to decay and record the pressure gauge 56 reading. If glove pressure drops below 6 in. WC for 30-mil glove or drops below 3 in. WC for 15-mil glove (+/−0.2 in. WC), the glove has failed, with a minimum detectable puncture of 0.0313 in. (794 μm). The 3-minute required test time for pressure to decay and 8/6 in. WC or 5/3 in. WC (+/−0.2 in. WC) starting test pressure/pass-fail pressure can be adjusted at the discretion of the radiological safety officer.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for detecting leaks in glovebox gloves, the system comprising:
  a. a first seal positioned within a glovebox aperture;
  b. a first pressurized fluid supply for circumferentially expanding the first seal against center facing surfaces of the aperture to a first pressure, wherein expansion of the first seal causes a second seal to reversibly contact exterior surfaces of the glovebox;
  c. a second pressurized fluid supply for inflating the glove to a second pressure; and
  d. a pressure gauge for detecting a pressure decrease of the second pressure.

2. The system as recited in claim 1 wherein the first pressure ranges from 20 psi to 25 psi.

3. The system as recited in claim 1 wherein the second pressure ranges from 5 inches water column to 12 inches water column.

4. The system as recited in claim 1 wherein the fluid is a gas selected from the group consisting of air, nitrogen, carbon dioxide, argon, helium and combinations thereof.

5. The system as recited in claim 1 wherein the first seal is adapted to receive the first fluid.

6. The system as recited in claim 1 wherein the second seal is reversibly deformable.

7. The system as recited in claim 1 wherein the glovebox operates at negative pressure.

8. The system as recited in claim 1 wherein the first fluid supply and the second fluid supply originate from a single pressurized fluid reservoir.

9. The system as recited in claim 8 wherein the reservoir is initially pressurized to between 30 psig and 90 psi.

10. An in situ method for detecting leaks in gloves attached to glove ports of a glovebox, the method comprising:
  a. applying a radially directed force to inside surfaces of cuffs of the gloves so as to hermetically seal the gloves from the exterior of the glovebox, thereby establishing a first seal, wherein the first seal and a second seal are simultaneously established, wherein the second seal is positioned on the exterior of the glovebox;
  b. inflating the gloves to a first pressure;
  c. monitoring the first pressure for any decrease in the first pressure over a predetermined period of time; and
  d. analyzing any decrease in pressure over the period of time to detect leaks in the gloves.

11. The method as recited in claim 10 wherein the predetermined period of time is monitored for between 3 minutes and 10 minutes.

12. The method as recited in claim 10 wherein the first pressure is between 5 psig and 12 psig.

13. The method as recited in claim 10 wherein the step of applying a radially directed force comprises positioning a deflated circular tube inside the cuffs such that the cuffs are circumscribing the tube and inflating the tube at a pressure to radially expand the tube and to force the cuffs against center facing surfaces of the glove ports.

14. The method as recited in claim 13 wherein a second seal is removably secured to the exterior surface of the glovebox defining the glove ports when the tube is inflated.

* * * * *